US 6,721,470 B2

(12) United States Patent
Bosselmann et al.

(10) Patent No.: US 6,721,470 B2
(45) Date of Patent: Apr. 13, 2004

(54) OPTICAL MEASUREMENT DEVICE IN A PRESSED-IN CONDUCTOR BAR IN AN ELECTRICAL MACHINE

(75) Inventors: Thomas Bosselmann, Marloffstein (DE); Peter Krämmer, Erlangen (DE); Nils Michael Theune, Erlangen (DE); Michael Willsch, Fürth (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/178,254

(22) Filed: Jun. 24, 2002

(65) Prior Publication Data

US 2002/0196994 A1 Dec. 26, 2002

Related U.S. Application Data

(63) Continuation of application No. PCT/DE00/04397, filed on Dec. 11, 2000.

(30) Foreign Application Priority Data

Dec. 23, 1999 (DE) .......................... 199 62 668

(51) Int. Cl.⁷ ................................. G02B 6/00
(52) U.S. Cl. ..................... 385/12; 385/37; 374/161; 250/227.14
(58) Field of Search ................ 385/12, 37; 374/161; 250/227.14

(56) References Cited

U.S. PATENT DOCUMENTS

| | | | |
|---|---|---|---|
| 4,348,587 A | * | 9/1982 | Tangonan et al. ...... 250/227.14 |
| 5,232,285 A | * | 8/1993 | Mannik ...................... 374/131 |
| 5,270,538 A | * | 12/1993 | Vali et al. ............... 250/227.18 |
| 5,892,860 A | | 4/1999 | Maron et al. ................ 385/12 |
| 6,078,705 A | * | 6/2000 | Neuschafer et al. .......... 385/12 |
| 6,392,746 B1 | * | 5/2002 | Buerli ....................... 356/73.1 |
| 2002/0009252 A1 | * | 1/2002 | Maron et al. ................. 385/12 |

FOREIGN PATENT DOCUMENTS

| | | | |
|---|---|---|---|
| DE | 195 07 941 A1 | 9/1995 | ........... H02K/3/14 |
| EP | 0 071 561 A2 | 2/1983 | ........... G02B/6/00 |
| JP | 06 118 120 | 4/1994 | ........... G01R/31/13 |
| JP | 08 080 011 | 3/1996 | ........... H02K/11/00 |
| JP | 2000-299967 A | 10/2000 | ........... H02K/11/00 |
| WO | 98/31987 | 7/1998 | .......... G01D/5/353 |
| WO | 00/57540 | 9/2000 | ........... H02K/11/00 |

OTHER PUBLICATIONS

M. Lequime: "Fiber Sensors For Industrial Applications", *12th International Conference on Optical Fiber Sensors Technical Digest*, Williamsburg, VA, Oct. 28–31 1997, pp. 61–71.

H. Fevrier et al.: "A Temperature Optical Fiber Sensor Network: From Laboratory Feasibility To Field Trial", *Conference Proceedings, 8th Optical Fiber Sensors Conference*, Monterey, CA, Jan. 29–31, 1992, pp. 262–265.

C. Meunier et al.: "Industrial Prototype of a Fiber–Optic Sensor Network for the Thermal Monitoring of the Turbogenerator of a Nuclear Power Plant—Design, Qualification, and Settlement", *Journal of Lightwave Technology*, vol. 13, No. 7, Jul. 1995, pp. 1354–1361.

"True Temp Model WTS–11 Fluoropitc® Thermometer". http:www.luxtron.comproduct/utilityfiberhtml.

* cited by examiner

Primary Examiner—Akm Enayet Ullah
Assistant Examiner—Daniel Petkovsek
(74) Attorney, Agent, or Firm—Laurence A. Greenberg; Werner H. Stemer; Ralph E. Locher

(57) ABSTRACT

An optical measuring device includes at least one optical sensor, an optical waveguide connected to the optical sensor, and an evaluation unit. The optical measuring device is intended for an electrical machine including at least one conductor that is pressed into a groove of a base body, the groove having two groove lateral walls. The optical sensor and a part of the optical waveguide that is located in a proximity of the sensor are disposed in the area of the groove on a narrow side of the conductor that faces away from both groove lateral walls.

15 Claims, 3 Drawing Sheets

OPTICAL MEASUREMENT DEVICE IN A PRESSED-IN CONDUCTOR BAR IN AN ELECTRICAL MACHINE

CROSS-REFERENCE TO RELATED APPLICATION

This application is a continuation of copending International Application No. PCT/DE00/04397, filed Dec. 11, 2000, which designated the United States and was not published in English.

BACKGROUND OF THE INVENTION

FIELD OF THE INVENTION

The invention relates to an optical measurement device for an electrical appliance having at least one electrical conductor that is pressed into a slot, which has two slot side walls, in a base body. In particular, the invention relates to an optical measurement device for an electrical appliance that is used in the field of electrical power generation and distribution, such as an electrical generator or an electrical transformer.

Such an electrical appliance, which is also referred to as power equipment, represents a very expensive and long-term investment. Its failure not only endangers the power equipment itself but, possibly, also results in very severe service reductions due to the down time associated with repair. To avoid such a condition, increasing use is being made of a diagnosis system, which may, for example, also include an optical measurement device, for early identification of defects. The diagnosis system furthermore allows a higher utilization level, making the power equipment more financially viable.

The physical configuration of the power equipment is optimized with regard to high efficiency, low eddy current losses, compact construction and good electrical isolation. For this reason, there are also no unused intermediate spaces or empty spaces in which a sensor could be accommodated without any redesign effort, especially in the active part of the power equipment. A stator winding or else a rotor winding of an electrical generator contains, for example, a large number of conductor bars that are pressed at high pressure into slots in a base body, in particular, a laminated stator core or a rotor body. This results in the compact construction that has been mentioned, without any significant intermediate spaces.

During operation, the conductor bars carry a very high electric current that may assume values up to the kA range, so that they are heated to a considerable extent. Their precise temperature, therefore, represents one of the important diagnosis information items. Due to the high potential difference between the individual conductor bars and between the conductor bars and the base body, an electrical sensor is not suitable for such a measurement task.

For this reason, the overview article "Fiber Sensors for Industrial Applications" by M. Lequime, 12th International Conference on Optical Fiber Sensors, 28–31.10.1997, pp. 66–71, describes various optical measurement devices for an electrical generator, which each use at least one optical sensor for measurement value detection. This is because, in contrast to a conventional electrical measurement sensor, an optical sensor can still operate very well in the presence of a high electrical voltage (typically greater than several tens of kilovolts), a high magnetic field (up to 5 Tesla), and in a corrosive atmosphere (hydrogen or sulfur hexafluoride). In addition to detecting the temperature of the coolant that is used, inter alia, for cooling the conductor rods, the described optical measurement devices also detect the vibration spectrum. Not only a fiber-optic point sensor, which is configured for a single measurement point, but also a fiber-optic sensor network with a number of measurement points are used.

The specialist article "A Temperature Optical Fiber Sensor Network: From Laboratory Feasibility to Field Trial" by H. Fevrier et al., 8th Optical Fiber Sensors Conference, 29–31.01.1992, pp. 262–265, describes an optical measurement device that is in the form of a fiber-optic sensor network with effectively distributed temperature detection using a so-called Optical Time Delay Reflectometry (OTDR) technique. During a field test on a 250 MW generator, a number of optical temperature sensors were positioned within the generator housing—some on a non-magnetic protective plate at ground potential and some on a coolant circuit water chamber at a high-voltage potential. However, no details are given about the precise installation precautions for the optical sensors or about the optical waveguide routing within the generator.

The specialist article "Industrial Prototype of a Fiber-Optic Sensor Network for the Thermal Monitoring of the Turbogenerator of a Nuclear Power Plant—Design, Qualification, and Settlement" by C. Meunier et al. in Journal of Lightwave Technology, Vol. 13, No. 7 July 1995, pp. 1354–1361, discloses a further optical measurement device for temperature detection in a 900 MW turbogenerator. The fiberoptic sensor network is, in this case, based on so-called white light interferometry, which makes it possible to interrogate a number of optical sensors at the same time. The optical sensors, which are intended for water temperature measurement, are adhesively bonded onto a water connecting element, which is located on a conductor in the outlet region of the coolant line. The application point for the optical sensors is, thus, disposed in the region of the end winding of the generator winding.

Furthermore, on the Internet page: http://www.luxtron.com/product/utility/fiber.html (as of Dec. 13, 1999), the Luxtron Corp. describes an optical sensor that is based on temperature-dependent fluorescence of a sensitive element. The sensor is particularly suitable for temperature measurement on the conductor winding of a high-voltage power transformer. However, no disclosure is given of how the temperature sensor can be applied to the conductor winding, or how the optical waveguide for supply purposes can be routed within the power transformer.

Furthermore, European Patent Application EP 0 071 561 A2 discloses an operating system to be monitored by optical waveguides. In addition, International Patent Application WO 98/31987 A1, corresponding to U.S. Pat. No. 5,892,860 to Maron et al., discloses a measurement variable being detected by an optical sensor in the form of a Faser-Bragg grating sensor. The Faser-Bragg grating sensor is, in this case, fitted to an electrical pump within a (natural oil) bore hole, and is connected to an evaluation unit on the earth's surface.

The prior art optical measurement devices, thus, allow either only indirect measurement variable detection, for example, in the case of determining the temperature in the coolant circuit, or there are no specific details as to how the optical sensor and the supplying optical conductor for direct measurement variable detection can be disposed, for example, on the conductor to be monitored on the conductor winding to be monitored.

SUMMARY OF THE INVENTION

It is accordingly an object of the invention to provide an optical measurement device for an electrical appliance having at least one electrical conductor that is pressed into a slot, which has two slot side walls, in a base body that overcomes the hereinafore-mentioned disadvantages of the heretofore-known devices of this general type and that detects the measurement variable as directly as possible on the electrical conductor. In the process, the operation of the electrical appliance should be influenced as little as possible. Furthermore, no redesign of the electrical appliance shall be required to make it possible to operate the optical measurement device.

With the foregoing and other objects in view, there is provided, in accordance with the invention, an optical measurement device for an electrical appliance having a base body with at least one slot having two slot side walls and at least one electrical conductor having a longitudinal face facing away from the two slot side walls and a plurality of conductor elements insulated from one another, the conductor pressed into the one slot, the optical measurement device including at least one optical sensor, at least one optical waveguide having a part adjacent the optical sensor and being connected to the optical sensor, the optical sensor to be interrogated by a light signal through the optical waveguide, an evaluation unit optically connected to the optical sensor, the optical sensor and the part to be disposed in a region of the slot at the longitudinal face, and at least one protective strip to be disposed at the longitudinal face.

The invention is based on the knowledge that the optical sensor and the part of the optical waveguide that is close to the sensor can be fitted on the longitudinal face in very close physical contact with the conductor, without this resulting in any detrimental effect on the operating behavior of the electrical appliance. The application point that has been identified as being particularly advantageous for the optical sensor and for the supply optical waveguide, thus, for the first time allows direct measurement variable detection on a conduction of an electrical appliance, in particular, in the form of power equipment. At the same time, such an application point does not require any redesign of the existing electrical appliance. It has been found that the solution according to the invention has major advantages in comparison to other application points on the conductor, not only with regard to the mechanical load on the optical sensor and on the supply optical waveguide, but also with regard to the possibility of redesign requirements.

The application point on the longitudinal face prevents unacceptably high mechanical loads acting on the optical sensor and on the optical waveguide during production and during operation of the electrical appliance. This is because, compared with the longitudinal face that faces away from the slot side walls, there is a considerably higher mechanical load on those contact faces of the conductor that face the slot side walls. Specifically, in most cases, the contact pressure acts, in particular, on these contact faces of the conductor. The fitting of the optical sensor and of the optical waveguide on the longitudinal face can, furthermore, be carried out very late in the manufacturing procedure, thus, furthermore assisting the aim of keeping the mechanical load on the optical sensor and on the optical waveguide as low as possible during the manufacturing process as well.

In accordance with another feature of the invention, at least one protective strip is additionally fitted on the longitudinal face. Such a configuration contributes to further reducing the mechanical load on the optical sensor and on the optical waveguide in the part close to the sensor. The force that acts on the longitudinal face when the conductor is being pressed into the slot is kept away from the optical sensor and from that part of the optical waveguide that is close to the sensor by the protective strip. The protective strip is composed of a material that is heat-resistant up to at least 180° C., such as Capton. However, it may also be a composite material including at least one of the materials plastic, carbon fibers, and ceramic. One example of such a composite material is glass-fiber reinforced plastic (GFP) or an epoxy filled with quartz powder. The quartz powder in this case results in the mechanical behavior, in particular, the thermal behavior, of the protective strip being matched to that of the optical waveguide, which is normally manufactured from quartz glass. Furthermore, a Nomex strip can also be used for the protective strip.

In accordance with a further feature of the invention, the protective strip is two protective strips disposed laterally alongside one another and the optical sensor and the part are disposed between the two protective strips.

It is also advantageous to place the optical sensor and that part of the optical waveguide that is close to the sensor between two protective strips that are disposed alongside one another on the longitudinal face. The two protective strips are in this case disposed laterally alongside one another and each run parallel to the longitudinal face of the conductor. The optical sensor and the optical waveguide, which are referred to in the following text by the generic term "optical components", are then located in a space between the two protective strips. Such a configuration results in a particular good protective effect for the optical components.

A similarly good protective effect is obtained with two different embodiments of the protective strip, in which the optical sensor and that part of the optical waveguide that is close to the sensor are at least partially or completely surrounded by the protective strip. In the first-mentioned case, the protective strip has, on one surface, an opening, for example, in the form of a groove or notch running in the longitudinal direction and into which the optical sensor and that part of the optical waveguide that is close to the sensor can easily be inserted. In the second-mentioned case, the optical sensor and that part of the optical waveguide that is close to the sensor are completely embedded in the protective strip. A protective strip construction that is particularly suitable for such a purpose includes two protective strip halves that can be joined together, one of which can be provided with a notch running in the longitudinal direction to hold that part of the optical waveguide that is close to the sensor.

In accordance with a further feature of the invention, the optical sensor is secured on a mount and is disposed, together with this mount, in a cutout that is additionally provided for such a purpose in the protective strip. This fixing of the optical sensor on the mount leads to improved sensor accuracy, particularly if the mount is composed of quartz glass so that it has the same thermal expansion behavior as the optical waveguide.

In a further preferred embodiment, at least that part of the optical waveguide that is close to the sensor, as well as the optical sensor, are disposed within an additional small tube, which is advantageously also composed of a material that is heat-resistant up to at least 180° C., in particular, once again being composed of quartz glass. The small tube provides additional mechanical protection for the electrical components.

With the objects of the invention in view, there is also provided an optical measurement device for an electrical generator having a stator, a core, a stator winding, and a rotor, the core having at least one slot with two slot side walls, the stator winding having at least one electrical conductor with a longitudinal face facing the rotor and a plurality of conductor elements insulated from one another, the conductor pressed into the at least one slot, the optical measurement device including at least one optical sensor, at least one optical waveguide having a part adjacent the at least one optical sensor and being connected to the at least one optical sensor, the at least one optical sensor to be interrogated by a light signal through the at least one optical waveguide, an evaluation unit optically connected to the at least one optical sensor, the at least one optical sensor and the part to be disposed in a region of the slot at the longitudinal face, and at least one protective strip to be disposed at the longitudinal face.

In a further advantageous embodiment, the conductor is part of a stator winding, for example, of an electrical generator. It is particularly advantageous if the longitudinal face of the conductor on which the optical sensor and the optical waveguide are located faces a rotor of the electrical generator. The optical sensor and the optical waveguide are then located in the region of an air gap that is always present in such an electrical generator. The optical components can be disposed directly on the conductor at this point, without any redesign of the electrical generator. Such an application point furthermore has the additional advantage that this region of the conductor is severely loaded electrically and mechanically during operation, and direct measurement information from this region is, therefore, particularly valuable for generator diagnosis.

However, it is also possible for the conductor to be a component of a rotor winding of an electrical generator. Due to the high centrifugal forces that occur in the rotor, the slot in the rotor base body into which the conductor is once again likewise pressed is also normally provided with a clamping wedge on the side facing the stator. The conductor can now be pressed with a high pressure against the clamping wedge during operation, by virtue of centrifugal forces. With such a rotor winding, it is, therefore, better to dispose the optical sensor and that part of the optical waveguide that is close to the sensor on a longitudinal face of the conductor facing away from the stator, and also facing away from the slot side walls. The mechanical load at such a point, that is to say, in particular, facing a slot base, is then at a minimum.

In accordance with an added feature of the invention, the tube is of quartz glass.

In accordance with an additional feature of the invention, the at least one electrical conductor has an outer electrical insulation and the at least one optical sensor and the part are disposed under the outer electrical insulation. Because there may be a potential difference of up to several tens of kilovolts between the base body and the conductor, the conductor has appropriate external electrical insulation, with an appropriately high dielectric constant. To ensure that the optical sensor is now coupled as well as possible to the conductor, a configuration underneath the outer electrical insulation is particularly advantageous. This relates, in particular, to temperature measurement on the conductor.

Because the optical sensor as well as the optical waveguide are composed only of dielectric material, the configuration underneath the outer electrical insulation means that there is no deterioration in the dielectric strength, either. The outer electrical insulation may, for example, include a multi-layer winding, in particular, impregnated with an epoxy resin, consisting of an insulating tape. The optical waveguide is preferably routed in the region of the base body underneath the outer electrical insulation and, in the region of a so-called end winding, which is located outside the base body and which is used for the electrical interconnection of a number of conductor bars that are pressed into the base body, is passed through the outer electrical insulation. To keep the mechanical load as low as possible, the optical components are preferably not fitted to the longitudinal face of the conductor until immediately before the outer electrical insulation is fitted.

It is particularly advantageous for the optical sensor to be in the form of a Faser-Bragg grating sensor, which can be produced scribing a Bragg grating into the optical waveguide. The geometrical dimensions of such an advantageous Faser-Bragg grating sensor are substantially governed by the optical waveguide that is used. Because this results in the Faser-Bragg grating sensor occupying an extremely small amount of space, it is easier to mount it on the longitudinal face of the conductor. It is furthermore advantageous that there is no need to input and output an optical signal into and out of the optical waveguide, in order to detect the measurement variable. In the case of a Faser-Bragg grating sensor, the light is always routed within the optical waveguide, thus, allowing measurement variables to be detected in a particularly insensitive manner.

The optical sensor that is used can be constructed to detect various measurement variables. The configuration in the form of a fiber-optic temperature sensor is particularly simple, while at the same time also being very useful for generator diagnosis. This is because the temperature detected directly on the conductor represents important information for a diagnosis system for monitoring the state of the electrical appliance. However, the optical sensor may also be configured for detecting another measurement variable, for example, mechanical vibration or mechanical acceleration.

In accordance with yet another feature of the invention, the at least one protective strip is connected to the at least one optical waveguide.

In accordance with yet a further feature of the invention, the at least one protective strip is two protective strips and the at least one optical waveguide is between the two protective strips.

In accordance with a concomitant feature of the invention, the at least one protective strip is one protective strip and the at least one optical waveguide is in the protective strip.

The optical measurement device may also, in particular, include a number of optical sensors and a number of optical waveguides. Such a sensor network then provides information from a large number of different measurement points within the electrical appliance so that it is possible to carry out a sound diagnosis procedure relating to the state of the electrical appliance.

Other features that are considered as characteristic for the invention are set forth in the appended claims.

Although the invention is illustrated and described herein as embodied in an optical measurement device in a pressed-in conductor bar in an electrical machine, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

In the figures of the drawings, unless stated otherwise, identical reference symbols denote identical parts.

Figure 1:
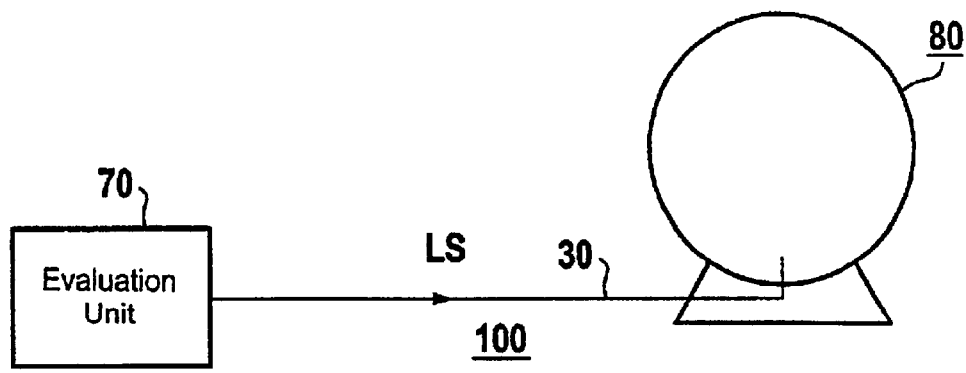
FIG. 1 is a block circuit diagram of an optical measurement device for an electrical generator according to the invention.

Referring now to the figures of the drawings in detail and first, particularly to FIG. 1 thereof, there is shown an optical measurement device 100 for an electrical appliance in the form of an electrical generator 80, with this optical measurement device 100 being intended for optical measurement variable detection within the generator 80. The optical measurement device 100 contains an evaluation unit 70, which is disposed outside the generator 80-and is optically connected through an optical waveguide 30 to an internal area of the generator 80, which is not shown in any more detail. A number of optical waveguides may also be provided. At least one optical measurement point in the internal area of the generator is interrogated by a light signal LS transmitted through the optical waveguide 30.

The electrical generator illustrated in FIG. 1 is configured for a high electrical power level, in particular of more than 100 MW. Currents of up to several kA and potential differences of up to several tens of kilovolts occur in the generator. However, instead of being used for the illustrated electrical generator 80, the optical measurement device 100 can be used just as well for an electrodynamic drive machine, such as a synchronous motor or an asynchronous motor, whose construction is very similar to that of the electrical generator 80. The optical measurement device 100 may also just as well be used for a high-voltage power transformer, whose operating voltage may even be up to several hundred kilovolts.

The optical waveguide 30 allows a potential difference that is as large as this to be coped with when necessary without any problems and without any major additional complexity. The optical components that are used have no adverse affect on the dielectric strength of the electrical generator 80.

Figure 2:
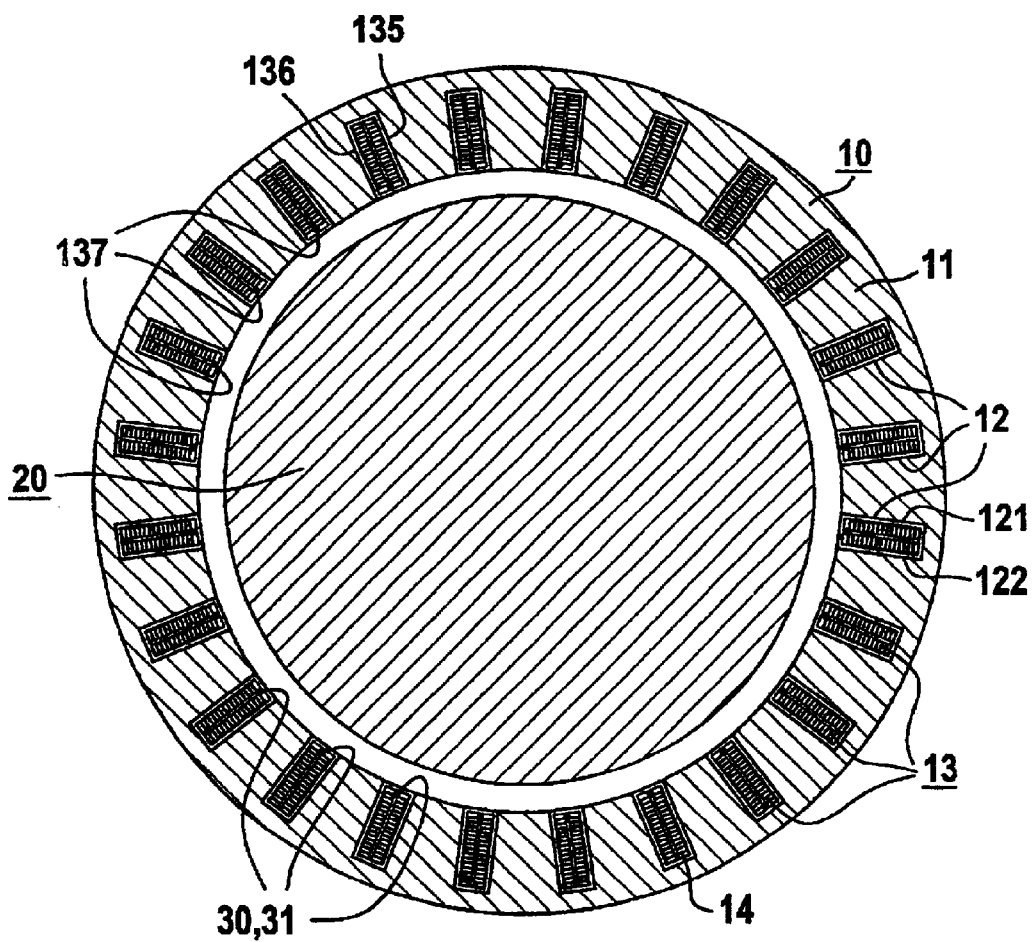
FIG. 2 is a cross-sectional view through a stator and a rotor of the electrical generator of FIG. 1.

FIG. 2 shows a cross section of a stator 10 and of a rotor 20 of the generator 80. The stator 10 contains a stator winding 14, which is composed, inter alia, of a number of conductors 13. The conductors 13, which are in this case in the form of conductor bars, are disposed within a laminated stator core 11 and are pressed at high pressure, into slots 12 in the laminated stator core 11. The optical measurement device 100 is now used, in particular, for detecting a measurement variable directly on one of the conductors 13 shown in FIG. 2.

The cross-section illustration in FIG. 2 also shows a number of parts 31 of the optical waveguide 30 that are close to the sensor. These are disposed on longitudinal faces 137 of the conductors 13 facing the rotor 20 and are located in the region of the air gap, which is not shown in any more detail, between the stator 10 and the rotor 20. Such an application point is also distinguished by a comparatively low mechanical load on that part 31 of the optical waveguide 30 that is close to the sensor. In contrast, a considerably greater mechanical force acts on side contact faces 135 and 136 of the conductor 13. The contact faces 135 and 136 in this case each face a respective slot side wall 121 and 122. High mechanical loads are actually produced on the contact faces 136 and 135 while the conductor 13 is being pressed in, and such forces would lead to destruction of any optical waveguide 30 fitted at this point.

In the case of other optical measurement devices, which are not illustrated, the optical waveguide 30 is disposed on a longitudinal face of a conductor that is a component of a rotor winding of the generator 80, or is a component of a winding of an electrical power transformed.

Figure 3:
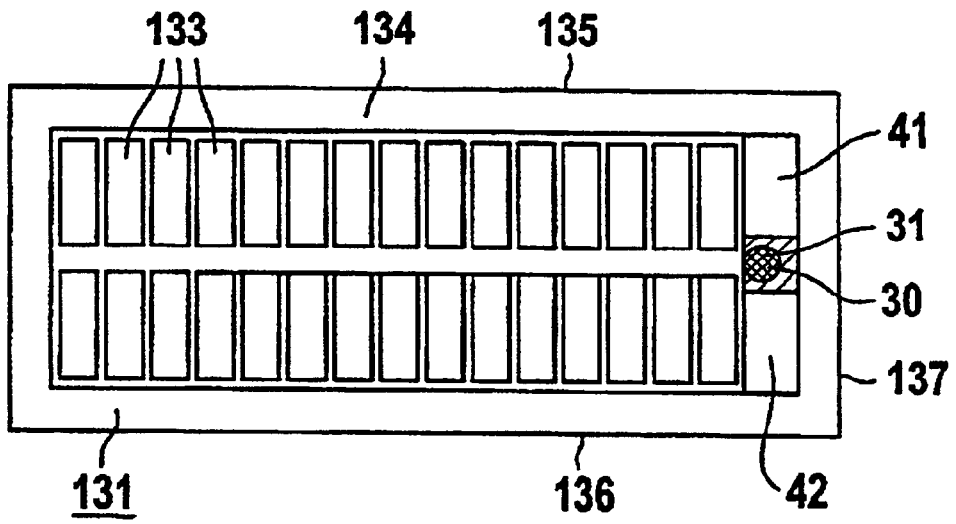
FIGS. 3 and 4 each are cross-sectional views through a conductor of one winding of the electrical generator of FIG. 1.
Figure 4:
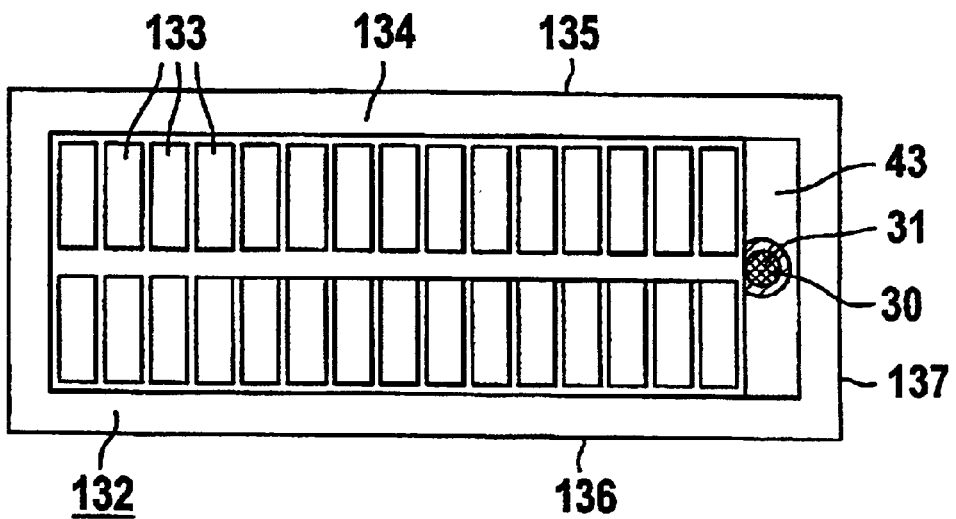

FIGS. 3 and 4 each show an enlarged cross-section illustration of a respective conductor bar 131 or 132 in the stator winding 14. Here, both conductor bars 131 and 132 have a rectangular cross-section and are composed of a large number of individual conductor elements 133. In other exemplary embodiments, which are not shown, the slot 12 and hence also the pressed-in conductor bars 131 and 132 may have a different cross-section geometry, for example a trapezoidal, V-shaped or U-shaped cross-section geometry. The conductor elements 133 are made of copper and are isolated from one another to reduce undesirable eddy currents. For the same reason, the conductor bars 131 and 132 are in the form of transposed bars or transposed conductors. The conductor elements 133 are, for this purpose, transposed systematically, so that each conductor element 133 occupies each space element in the rectangular cross-section at least once in the longitudinal profile of the transposed bar. The conductor elements 133 are surrounded in their entirety by common outer electrical insulation 134. That part 31 of the optical waveguide 30 that is close to the sensor is disposed on or near the longitudinal face 137 between the conductor elements 133 and the outer insulation 134. There is also a non-illustrated optical sensor at this point for the embodiments of FIGS. 3 and 4.

For protection against mechanical loads, that part 31 of the optical waveguide 30 that is close to the sensor, as well as the non-illustrated optical sensor, are disposed either between two protective strips 41 and 42 or within one protective strip 43. The protective strips 41 to 43 are preferably made of heat-resistant Capton and their task is to absorb any mechanical force acting on the longitudinal face 137 and to keep it away, in particular, from that part 31 of the optical waveguide 30 that is close to the sensor, or from the non-illustrated optical sensor. This results in a further reduction in the mechanical load on the optical components located at this point.

A space that is shaded in FIGS. 3 and 4 but is not identified in any greater detail, between the optical waveguide 30 and the protective strips 41 to 43 may, if required, also be filled with a voltage-resistant dielectric, for example, a silicone, a sulfur-hexafluoride gas, or a foam material. This voltage-resistant dielectric filling is then used, in particular, to avoid undesirable partial discharges in the intermediate space.

In such a case, the protective strips 41 and 42 each have a width (which is governed by the conductor bar 131) of about 8 mm and a height that is governed by the optical waveguide 30 that is used, and is between 0.1 and 3 mm. To keep the space requirement as small as possible, the height of the protective strips is chosen to be as small as possible. Typical values for the height are 0.5 mm, 1 mm, or 1.5 mm. The protective strips 41 and 42 may, in particular, also each be composed of a Nomex strip, which has these height dimensions. The height details also apply in a corresponding manner to the protective strip 43. In the illustrated example, the protective strips 41 and 43 have precisely the same length as the slot 12. However, if required, the protective strips 41 and 43 may also be shorter.

Placing the optical sensor immediately adjacent to the conductor elements 133 through which the current flows results in very high measurement accuracy. The closely adjacent configuration results in very good thermal coupling so that the conductor temperature of the conductor bar 131 or 132, in particular, can be detected very accurately. The achievable accuracy is considerably better than when measuring the water temperature in the coolant circuit indirectly. The advantageous configuration of the optical components underneath the outer electrical insulation 134 also contributes to the avoidance of undesirable effects, such as hysteresis or offset errors, which could otherwise occur in the case of a configuration on the outer electrical insulation 134. At the same time, the dielectric strength of the insulated conductor bar 131 or 132 is not significantly adversely affected by the optical waveguide 30 that is disposed underneath the outer electrical insulation 134 because the optical waveguide 30 is composed of dielectric material.

Figure 5:
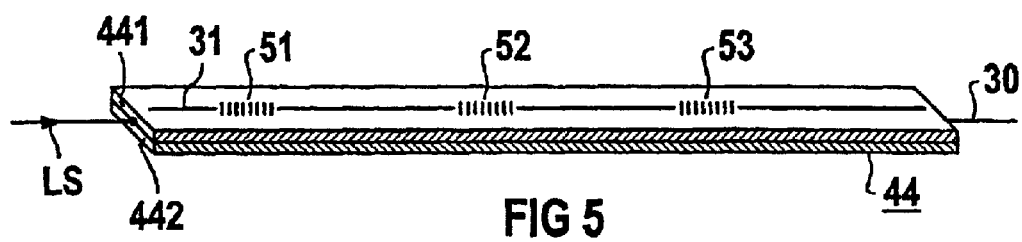
FIGS. 5 to 7 each are fragmentary, perspective views of a diagrammatic configuration of optical sensors and optical waveguides integrated in protective strips according to the invention.

As shown in FIG. 5, it is also feasible for the optical waveguide 30 to be completely embedded in a protective strip 44 in its part 31 that is close to the sensor and that, in this case, by way of example, also contains three optical sensors 51, 52, and 53. The protective strip 44 is composed of two protective strips 441 and 442 that are joined together. The optical waveguide 30 is inserted into a non-illustrated notch, in one of the two protective strip halves 441 and 442.

Figure 6:
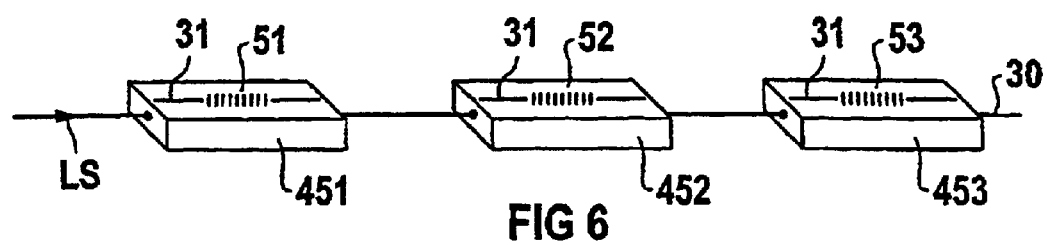

If a greater distance is required between the individual sensors 51 to 53, the protective strip may also be formed as shown in FIG. 6, from a number of protective strip elements 451, 452 and 453 that then each hold one or more of the optical sensors 51 to 53. Such a configuration improves the flexibility for the location of the measurement points on the conductor 13. If necessary, it is, thus, also possible to use one optical waveguide 30 for detecting measurement variables on a number of conductors 13.

Figure 7:
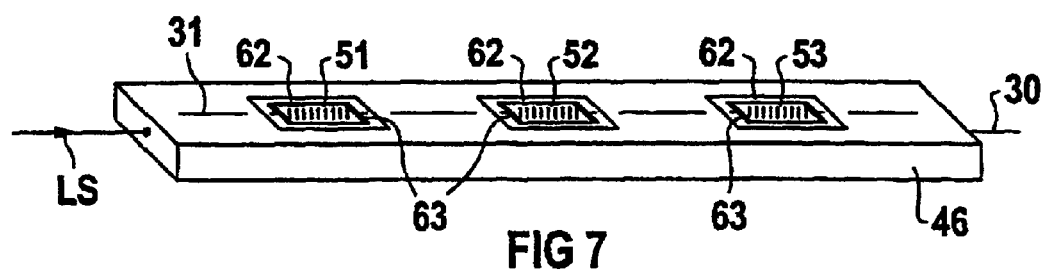

In the exemplary embodiment shown in FIG. 7, the optical sensors 51 to 53 are each fixed on a mount 63 composed of quartz glass. This improves the measurement accuracy because the thermal coefficients of expansion are comparable. The mounts 63 are disposed in cutouts 62 provided for such a purpose in a protective strip 46. The Faser-Bragg grating sensors 51 to 53 are embedded in the composite material body 62, together with the mounts 63.

Figure 8:
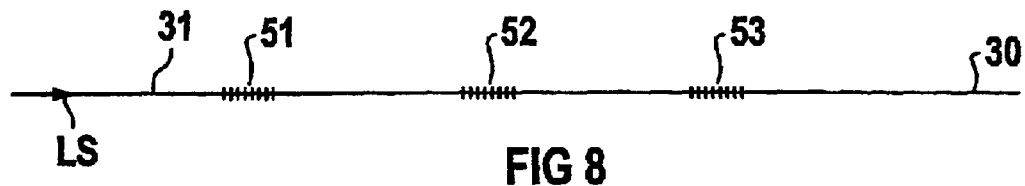
FIG. 8 is a diagrammatic illustration of an optical waveguide with integrated optical sensors according to the invention.
Figure 9:
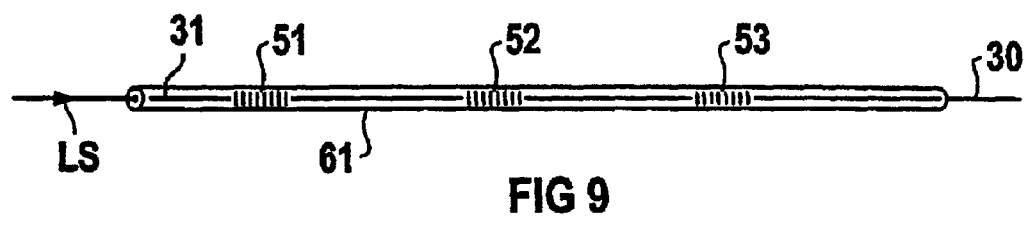
FIG. 9 is a fragmentary, perspective view of an optical waveguide disposed within a small tube according to the invention.

FIGS. 8 and 9 relate to exemplary embodiments of that part 31 of the optical waveguide 30 that is close to the sensor, as well as to the optical sensors 51, 52, and 53. The illustrated configurations are each then placed on or near the longitudinal face 137 of the conductor bar 131 or 132, between the protective strips 41 and 42 or within the protective strips 43, 44, and 46, or within the protective strip elements 451, 452, and 453.

The simplest exemplary embodiment is illustrated in FIG. 8, in which just the optical waveguide 30 as well as the optical sensors 51, 52, and 53 that are integrated in it are intended to be embedded directly in one of the above mentioned protective strip configurations. The three optical sensors 51, 52, and 53 that are shown are in this case each in the form of Faser-Bragg grating sensors, which are produced by scribing a Bragg grating into the optical waveguide 30 in a conventional manner. Such a Bragg grating changes its optical reflectivity under the influence of the measurement variable to be detected. In the present case, the Faser-Bragg grating sensors 51 to 53 are used to detect the temperature at the respective application points on the conductor 13. The Bragg gratings of the Faser-Bragg grating sensors 51 to 53 differ in the wavelength at which the maximum reflectivity in each case occurs. Only one sensor-specific spectral component of a broadband light signal LS, which strikes the Faser-Bragg grating sensors 51 to 53, is, thus, in each case reflected back to the evaluation unit 70, where the measurement values are then determined from the precise spectral position of the components that are reflected back.

The sizes of the Faser-Bragg grating sensors 51 to 53 are governed by the dimensions of the optical waveguide 30. A typical external diameter of a suitable optical waveguide 30 is, for example, 125 $\mu$m. The length extent of the Faser-Bragg grating sensors 51 to 53, is, for example, about 3 mm. Thus only that part 31 of the optical waveguide 31 that is close to the sensor with the respective Faser-Bragg grating sensors 51 to 53 respectively integrated in the optical waveguide 30 may be laid along the longitudinal face 137 of the conductor 13. Only a small amount of space is required in this case. The protective strips 41 to 46 may also be configured to be correspondingly small.

As shown in FIG. 9, at least the part 31 of the optical waveguide-30 that is close to the sensor, as shown in FIG. 8, may be introduced into an additional small tube 61, and may then be embedded, together with this small tube 61, in one of the above mentioned protective strip configurations. The small tube 61 is preferably composed of quartz glass and is used to provide additional mechanical protection for the optical waveguide 30. The optical waveguide 30 runs loosely within the small tube 61. If necessary, the small tube 61 may, however, also be filled with a voltage-resistant dielectric medium.

We claim:

1. An optical measurement device for an electrical appliance having a base body with at least one slot having two slot side walls and at least one electrical conductor having a longitudinal face facing away from the two slot side walls and a plurality of conductor elements insulated from one another, the conductor pressed into the at least one slot, the optical measurement device comprising:

at least one Faser-Bragg grating sensor;

at least one optical waveguide:
   having a part adjacent said at least one Faser-Bragg grating sensor; and
   being connected to said at least one Faser-Bragg grating sensor;

said at least one Faser-Bragg grating sensor to be interrogated by a light signal through said at least one optical waveguide;

an evaluation unit optically connected to said at least one Faser-Bragg grating sensor;

said at least one Faser-Bragg grating sensor and said part to be disposed in a region of the slot at the longitudinal face; and at least one protective strip to be disposed at the longitudinal face.

2. The measurement device according to claim 1, wherein:
said at least one protective strip is two protective strips disposed laterally alongside one another; and
said at least one Faser-Bragg grating sensor and said part are disposed between said two protective strips.

3. The measurement device according to claim 1, wherein said at least one Faser-Bragg grating sensor and said part are at least partially surrounded by said at least one protective strip.

4. The measurement device according to claim 1, wherein said at least one Faser-Bragg grating sensor and said part are embedded in said at least one protective strip.

5. The measurement device according to claim 1, including a mount, said at least one protective strip defining a cutout for receiving said mount, and said at least one Faser-Bragg grating sensor being fixed at said mount.

6. The measurement device according to claim 1, including a tube, said at least one Faser-Bragg grating sensor and said part disposed in said tube.

7. The measurement device according to claim 6, wherein said tube is of quartz glass.

8. The measurement device according to claim 1, wherein:
said at least one electrical conductor has an outer electrical insulation; and
said at least one Faser-Bragg grating sensor and said part are disposed under said outer electrical insulation.

9. The measurement device according to claim 1, wherein said at least one Faser-Bragg grating sensor is an optical temperature sensor.

10. The measurement device according to claim 1, wherein said at least one protective strip is connected to said at least one optical waveguide.

11. The measurement device according to claim 10, wherein:
said at least one protective strip is two protective strips; and
said at least one optical waveguide is between said two protective strips.

12. The measurement device according to claim 10, wherein:
said at least one protective strip is one protective strip; and
said at least one optical waveguide is in said protective strip.

13. An optical measurement device for an electrical generator having a stator, a core, a stator winding, and a rotor, the core having at least one slot with two slot side walls, the stator winding having at least one electrical conductor with a longitudinal face facing the rotor and a plurality of conductor elements insulated from one another, the conductor pressed into the at least one slot, the optical measurement device comprising:
at least one Faser-Bragg grating sensor;
at least one optical waveguide:
having a part adjacent said at least one Faser-Bragg grating sensor; and
being connected to said at least one Faser-Bragg grating sensor;
said at least one Faser-Bragg grating sensor to be interrogated by a light signal through said at least one optical waveguide;
an evaluation unit optically connected to said at least one Faser-Bragg grating sensor;
said at least one Faser-Bragg grating sensor and said part to be disposed in a region of the slot at the longitudinal face; and
at least one protective strip to be disposed at the longitudinal face.

14. In an electrical appliance having a base body with at least one slot having two slot side walls and at least one electrical conductor having a longitudinal face facing away from the two slot side walls and a plurality of conductor elements insulated from one another, the conductor pressed into the at least one slot, an optical measurement device comprising:
at least one Faser-Bragg grating sensor;
at least one optical waveguide:
having a part adjacent said at least one Faser-Bragg grating sensor; and
being connected to said at least one Faser-Bragg grating sensor;
said at least one Faser-Bragg grating sensor to be interrogated by a light signal through said at least one optical waveguide;
an evaluation unit optically connected to said at least one Faser-Bragg grating sensor;
said at least one Faser-Bragg grating sensor and said part to be disposed in a region of the slot at the longitudinal face; and
at least one protective strip to be disposed at the longitudinal face.

15. In an electrical generator having a stator, a core, a stator winding, and a rotor, the core having at least one slot with two slot side walls, the stator winding having at least one electrical conductor with a longitudinal face facing the rotor and a plurality of conductor elements insulated from one another, the conductor pressed into the at least one slot, an optical measurement device comprising:
at least one Faser-Bragg grating sensor;
at least one optical waveguide:
having a part adjacent said at least one Faser-Bragg grating sensor; and
being connected to said at least one Faser-Bragg grating sensor;
said at least one Faser-Bragg grating sensor to be interrogated by a light signal through said at least one optical waveguide;
an evaluation unit optically connected to said at least one Faser-Bragg grating sensor;
said at least one Faser-Bragg grating sensor and said part to be disposed in a region of the slot at the longitudinal face; and
at least one protective strip to be disposed at the longitudinal face.

* * * * *